(12) United States Patent
Rodrigues et al.

(10) Patent No.: US 7,804,586 B2
(45) Date of Patent: Sep. 28, 2010

(54) METHOD AND SYSTEM FOR IMAGE PROCESSING FOR PROFILING WITH UNCODED STRUCTURED LIGHT

(75) Inventors: Marcos A. Rodrigues, Sheffield (GB); Alan Robinson, Sheffield (GB); Lyuba Alboul, Sheffield (GB)

(73) Assignee: Sheffield Hallam University (GB)

( * ) Notice: Subject to any disclaimer, the term of this patent is extended or adjusted under 35 U.S.C. 154(b) by 362 days.

(21) Appl. No.: 10/597,468

(22) PCT Filed: Feb. 3, 2005

(86) PCT No.: PCT/GB2005/000344

§ 371 (c)(1),
(2), (4) Date: Jun. 17, 2008

(87) PCT Pub. No.: WO2005/076214

PCT Pub. Date: Aug. 18, 2005

(65) Prior Publication Data

US 2008/0237505 A1    Oct. 2, 2008

(30) Foreign Application Priority Data

Feb. 5, 2004    (GB) ................................. 0402565.5

(51) Int. Cl.
*G01C 3/08* (2006.01)
*G01B 11/25* (2006.01)
(52) U.S. Cl. ...................................... 356/4.01; 356/603
(58) Field of Classification Search ............... 356/4.01, 356/4.07, 141.5, 603; 382/103, 106
See application file for complete search history.

(56) References Cited

U.S. PATENT DOCUMENTS

| | | | | |
|---|---|---|---|---|
| 6,657,705 | B2 * | 12/2003 | Sano et al. | 356/4.01 |
| 7,525,669 | B1 * | 4/2009 | Abdollahi | 356/603 |
| 7,672,505 | B2 * | 3/2010 | Sasaki | 382/154 |
| 7,710,545 | B2 * | 5/2010 | Cramblitt et al. | 356/4.01 |
| 2002/0057832 | A1 | 5/2002 | Proesmans et al. | |
| 2002/0159073 | A1 * | 10/2002 | Chen et al. | 356/603 |
| 2008/0159595 | A1 * | 7/2008 | Park et al. | 382/106 |

FOREIGN PATENT DOCUMENTS

EP    1243894 A1    9/2002

OTHER PUBLICATIONS

Robinson, Alan et al.; "Methods for Indexing Stripes in Uncoded Structured Light Scanning Systems"; Journal of WSCG; vol. 12; No. 1-3; Feb. 5, 2004; Czech Republic.

* cited by examiner

*Primary Examiner*—Isam Alsomiri
(74) *Attorney, Agent, or Firm*—Clark Hill PLC

(57) ABSTRACT

A 3D scanning apparatus configured to image a physical entity comprises a radiation projector for projecting a plurality of radiation stripes onto the physical entity, a detector for detecting striped radiation received from the physical entity; and a data storage device for storing the received radiation as a pixellated bitmap image, the apparatus characterised in that the physical entity, the radiation projector and the detector are geometrically arranged to constrain the number of times that each received stripe is permitted to occur in a given pixel row of the bitmap, the geometrical constraint determining a stored occlusion classification comprising a plurality of types of occlusions and the apparatus additionally comprising an occlusion type processing means configured to utilise the classification for detecting the various types of occlusions in said received image data.

36 Claims, 14 Drawing Sheets

Bitmap array $A_B$

Peak array $A_P$

Index array $A_f$

Indexed points I

FIG. 11A
FIG. 11B
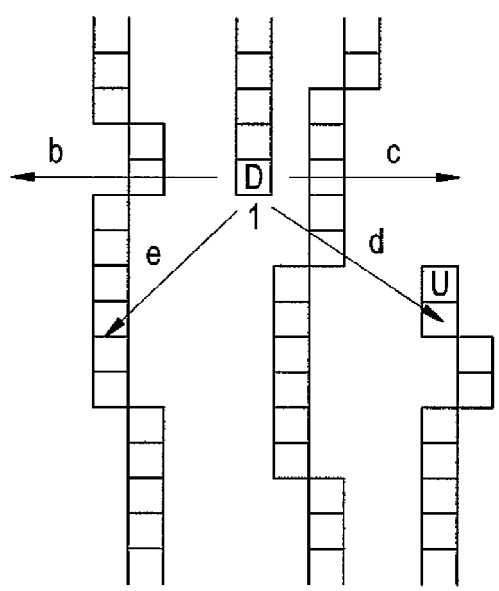
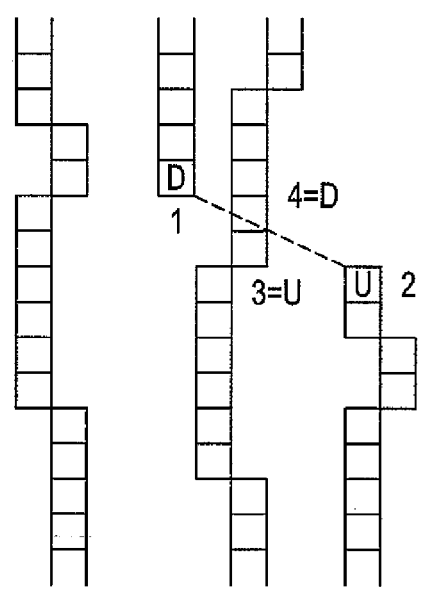

FIG. 13A
FIG. 13B
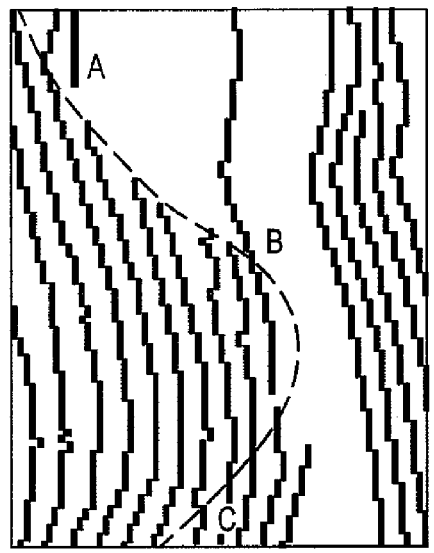
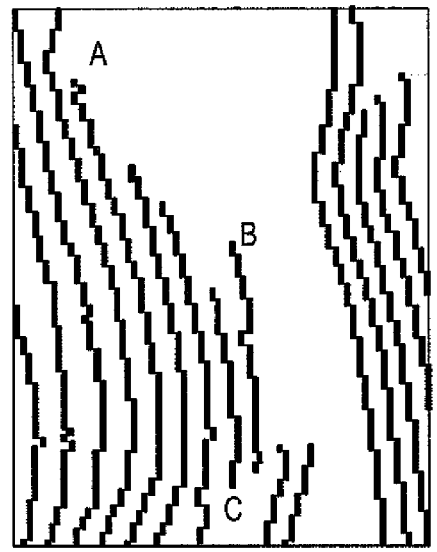

FIG. 14

| Test no: | Occlusion detection | Algorithm types | Corresponding peaks C | Miscorresponding peaks M | Noncorresponding peaks X | Total Peaks C + M + X |
|---|---|---|---|---|---|---|
| 1 | NO | Stripe tracer | 18681 | 2304 | 362 | 21347 |
| 2 | YES | Stripe tracer | 17332 | 0 | 0 | 17332 |
| 3 | NO | Flood filler | 26120 | 5188 | 14333 | 45641 |
| 4 | YES | Flood filler | 25668 | 2175 | 31 | 27874 |

METHOD AND SYSTEM FOR IMAGE PROCESSING FOR PROFILING WITH UNCODED STRUCTURED LIGHT

RELATED/PRIORITY APPLICATION

This application is a National Phase filing regrading International Application No. PCT/GB2005/000344 filed on Feb. 3, 2005, which claims priority from British Application No. 0402565.5 filed on Feb. 5, 2004.

FIELD OF THE INVENTION

The present invention relates to apparatus and methods for three dimensional scanning and particularly, but not exclusively, the invention relates to apparatus and methods for determining the order of a sequence of stripes captured in an uncoded structured light scanning system.

BACKGROUND OF THE INVENTION

Scanners, that is devices that can capture an image and convert it into a unique set of electrical signals are well known. Similarly 3-dimensional (3D) scanning systems are known that can image an object to obtain 3D surface representations of the object. Fields of application of 3D scanning systems are varied and, for example, include medical imaging, reverse engineering, computer vision, and video and film production. By object it is meant herein any physical entity such as a real object, a hidden object located below a surface, but viewable using certain kinds of radiation or a physical system such as a fluid flow that is not at first sight within the classical meaning of the term object.

The goal of structured light techniques is to measure the shape of three dimensional objects using automatic non-contact techniques. Early systems used a single stripe or spot of laser light to measure a small part of the object in each scan. Now the availability of controlled light output from LCD projectors allows the projection of a more complex pattern of light to increase the area measured in a single instantaneous scan.

(1) Single Stripe Systems

The classic single stripe scanning system is described in the following paper: J.-A. Beraldin, M. Rioux, F. Blais, G. Godin, R. Baribeau, (1992) *Model-based calibration of a range camera*, proceedings of the 11th International Conference on Pattern Recognition: 163-167. The Hague, The Netherlands. Aug. 30-Sep. 3, 1992, [Ber92a]. This system provides the profile of one "slice" through the target object. In order to build a model of the complete surface a number of spatially related profiles must be scanned. To achieve this a sequence of scans is captured. For each scan, the target object is moved in relation to the scanner, or the projected stripe moves in relation to the object, the movement being controlled to the same resolution as required by the scanning system. As will be understood by those skilled in the art such a single stripe system may require an accuracy of 1:20000.

(2) Multi-Stripe Systems

To avoid the need for accurate mechanisms and in order to speed up the acquisition process, a number of stripes can be projected at or substantially at the same time and captured as a sequence of stripes in a single frame. Unlike with the single stripe systems an accurate rotation estimate is not required and such systems offer free-form imaging by which it is meant imaging without the restriction of using a mechanical rotation device or a mechanical rotation indexing system.

3D multi-stripe scanning apparatus and methods are known for determining the order of a sequence of stripes captured in an uncoded structured light scanning system, i.e. where all the stripes are projected with uniform colour, width and spacing. A single bitmap image shows a pattern of vertical stripes from a projected source. If the target object is a planar surface then these stripes are uniformly spread over the surface in an intuitive manner. However these vertical stripes are deformed by the surfaces of more complex target objects, such as, for example, a target object comprising a physical model of a human head where in particular heavier distortion occurs around the nasal area. If a correspondence can be determined between the projected stripes and those captured in the bitmap, a spatial measurement of the surface can be derived using standard range-finding methods.

However, it is frequently difficult to determine which captured stripe corresponds to which projected stripe, when we attempt to index the captured sequence in the same order as the projected sequence. We call this the stripe indexing problem. For this reason methods have been devised to uniquely mark each stripe:

(1) by colour as described in the paper: C. Rocchini, P. Cignoni, C. Montani, P. Pingi and R. Scopigno, (2001) *A low cost 3D scanner based on structured light*, Computer Graphics Forum (Eurographics 2001 Conference Proc.), vol. 20 (3), 2001, pp. 299-308, Manchester, 4-7 Sep. 2001, [Roc01a];

(2) by stripe width as described in the paper: Raymond C. Daley and Laurence G. Hassebrook, (1998) Channel capacity model of binary encoded structured light-stripe illumination, in Applied Optics, Vol. 37, No 17, 10 Jun. 1998, [Dal98a]; and (3) by a combination of both as described in the paper: Li Zhang, Brian Curless and Stephen M. Seitz, (2002) *Rapid Shape Acquisition Using Color Structured Light and Multi-pass Dynamic Programming*, $1^{st}$ International Symposium on 3D data processing, visualization and transmission, Padova, Italy, Jun. 19-22, 2002, [Zha02a].

These and other works highlight the disadvantages of coded structured light: with colour indexing there may be weak or ambiguous reflections from surfaces of a particular colour, and with stripe width variations the resolution is less than for a uniform narrow stripe. This last problem can be addressed by projecting and capturing a succession of overlapping patterns of differing width as disclosed in the paper: Olaf Hall-Holt and Szymon Rusinkiewicz, (2001) Stripe Boundary Codes for Real-Time Structured-Light Range Scanning of Moving Objects, proceedings of the Eighth International Conference on Computer Vision (ICCV 2001), July 2001, [Hal01a]. However this means that it is not possible to measure the surface in a single frame. Single frame or "one-shot" capture is desirable because it speeds up the acquisition process, and leads to the possibility of capturing moving surfaces.

Moreover, because of the limits of any colour coding scheme, ambiguities will still exist; and stripe width coding is likely to increase the difficulty of interpreting shape correctly, such as when occlusions occur.

In summary, existing prior art methods are thus known which uniquely encode each stripe, such as by stripe colour or by stripe width, in order to avoid ambiguous stripe identification. However, colour coding suffers due to uneven colour reflection which is caused by the colour of the physical entity being imaged interfering with the colour coded stripes. A major problem with a variable width coded approach is that it reduces the measured resolution of the physical entity being imaged. In view of the problems with the prior art methods there is therefore a need to improve structured light scanning systems. Furthermore many other imaging methodologies using radiations other than structured light experience similar or related problems. Thus there is also a need to overcome such problems in various imaging methodologies that use radiations other than visible light.

SUMMARY OF THE INVENTION

An object of the present invention is to provide a 3D multi-stripe scanning apparatus and method that enables the stripes obtained from imaging a complex object to be accurately indexed (that is correctly identified) without the need for using stripes of different widths.

Another object of the present invention is to provide a 3D multi-stripe scanning apparatus and method that enables the stripes obtained from imaging a complex object to be accurately indexed without the need for using stripes that are colour coded.

A further object of the present invention is, in respect of a multi-stripe scanning system, to geometrically constrain the relative positions of a physical entity being imaged, a radiation projector and a radiation detector so that stripe indexing can be performed using uniform uncoded stripes.

Yet a further object of the present invention is to provide a scanning method and an apparatus embodying the method that detects a plurality of types of occlusions which are defined in accordance with the constrained geometry.

A further object of the present invention is to provide one or more processing routines for performing stripe indexing in such a geometrically constrained set-up of a multi-stripe scanner.

Yet a further object of the present invention is to provide an improved free-form scanning apparatus and method for use in 3D model building.

Yet a further object of the present invention is to provide improved scanning techniques and apparatus that may be used in a wide variety of imaging methodologies that either use stripes that are reflected off of a physical entity or perhaps slices through an object (a good example of the latter being CT X-ray scanning as used in medical imaging).

According to a first aspect of the present invention there is provided a 3D scanning apparatus configured to image a physical entity, said apparatus comprising:

a radiation projector for projecting a plurality of radiation stripes onto said physical entity;

a detector for detecting said striped radiation received from said physical entity; and a data storage device for storing said received radiation as a pixellated bitmap image;

said apparatus characterised in that said physical entity, said radiation projector and said detector are geometrically arranged to constrain the number of times that each said received stripe is permitted to occur in a given pixel row of said bitmap, said geometrical constraint determining a stored occlusion classification comprising a plurality of types of occlusions and said apparatus additionally comprising an occlusion type processing means configured to utilise said classification for detecting said various types of occlusions in said received image data.

Preferably said radiation projector utilises visible wavelength electromagnetic radiation and said detector is configured to detect visible light.

Preferably said geometrical constraint restricts said predetermined number of times to once per row.

Preferably said stripes are uniform uncoded stripes.

Preferably said physical entity is spatially defined with respect to a Cartesian coordinate frame $(X_O, Y_O, Z_O)$; said projector has origin $O_P$ in a Cartesian coordinate frame $(X_P, Y_P, Z_P)$; and said detector has origin $O_L$ in a Cartesian coordinate frame $(X_L, Y_L, Z_L)$, and preferably said geometrical constraint comprises alignment of said projector and said detector such that coordinate axes $Z_O$, $Z_P$, $Z_L$, are substantially parallel and coordinate axes $X_O$, $X_P$ and $X_L$ are substantially parallel.

Preferably said geometrical constraint comprises configuring said coordinate axes $Z_O$, $Z_P$, $Z_L$, $X_O$, $X_P$ and $X_L$ to all lie in substantially the same plane.

Preferably said geometrical constraint additionally comprises positioning said projector so that its origin $O_P$ lies on said $X_L$ axis of said detector.

Preferably said geometrical constraint comprises positioning said projector so that its origin $O_P$ lies on said $X_L$ axis of said detector such that said coordinate frame origins $O_P$ and $O_L$ lie on the same plane.

Preferably said same plane is inclined at an angle $\alpha$ to axis $Z_L$.

Preferably said projector projects visible light and said detector comprises a video camera having focal length F, said same plane being inclined at an angle $\alpha$ to axis $Z_L$ and said plane being defined in accordance with the equation: $y_B = -F \tan \alpha$ such that a beam projected in said plane is reflected back in the same plane and onto the image plane at row $-F \tan \alpha$.

Preferably said occlusion type processing means is configured to process said obtained image data into an array of peaks of peak pixel data, each said peak substantially representing the centre of a said stripe received by said detector.

Preferably said occlusion type processing means is configured to search said peaks in said array for discontinuities, said processing means being further configured to:

create an occlusion map through identifying and labelling said discontinuities as at least being of a first type or of a second type of discontinuity.

Preferably said created occlusion map is used to define boundaries for use by an indexing processing means, said indexing means being configured to index said stripes by using said boundary information and said stored classification.

Preferably said indexing processing means is configured to process said peak pixel data in accordance with steps comprising:

(a) selecting a start position in said peak pixel data and initialising a stripe index count for said selected stripe;

(b) tracing the current stripe in a first direction along said stripe until a said first boundary condition is met;

(c) returning to said start position and tracing said current stripe in the opposite direction to said first direction until a said boundary condition is met;

(d) increasing the stripe index and moving to the next stripe in a third direction, said third direction substantially perpendicular to said first and second directions, and repeating steps (b) and (c);

(e) repeating step (d) until a second boundary condition is met; and (f) returning to said start position and repeating steps (d) and (e), but moving in a fourth direction, said fourth direction being substantially 180° from said third direction, and decreasing said stripe index each time Preferably said indexing processing means is configured to process said peak pixel data in accordance with a flood fill recursive processing routine.

Preferably said indexed stripes are used to reconstruct a 3D surface of a scanned physical entity.

According to a second aspect of the present invention there is provided, in a 3D scanning apparatus configured to image a physical entity, said apparatus comprising a radiation projector for projecting a plurality of radiation stripes onto said physical entity, a detector for detecting said striped radiation received from said physical entity and a data storage device for storing said received radiation as a pixellated bitmap image, a method of imaging characterised in that:

said physical entity, said radiation projector and said detector are geometrically arranged to constrain the number of times that each said received stripe is permitted to occur in a given pixel row of said bitmap, said geometrical constraint determining a stored occlusion classification comprising a plurality of types of occlusions and said apparatus additionally comprising an occlusion type processing means configured to utilise said classification for detecting said various types of occlusions in said received image data.

Preferably said method utilises visible wavelength electromagnetic radiation.

Preferably said geometrical constraint restricts said predetermined number of times to once per row.

Preferably said stripes are uniform uncoded stripes.

Preferably said physical entity is spatially defined with respect to a Cartesian coordinate frame $(X_O, Y_O, Z_O)$; said projector has origin $O_P$ in a Cartesian coordinate frame $(X_P, Y_P, Z_P)$; and said detector has origin $O_L$ in a Cartesian coordinate frame $(X_L, Y_L, Z_L)$, and preferably said geometrical constraint comprises alignment of said projector and said detector such that coordinate axes $Z_0, Z_P, Z_L$, are substantially parallel and coordinate axes $X_0, X_P$ and $X_L$ are substantially parallel.

Preferably said geometrical constraint comprises configuring said coordinate axes $Z_0, Z_P, Z_L, X_0, X_P$ and $X_L$ to all lie in substantially the same plane.

Preferably said geometrical constraint additionally comprises positioning said projector so that its origin $O_P$ lies on said $X_L$ axis of said detector.

Preferably said geometrical constraint comprises positioning said projector so that its origin $O_P$ lies on said $X_L$ axis of said detector such that said coordinate frame origins $O_P$ and $O_L$ lie on the same plane.

Preferably said same plane is inclined at an angle $\alpha$ to axis $Z_L$.

Preferably said projector projects visible light and said detector comprises a video camera having focal length F, said same plane being inclined at an angle $\alpha$ to axis $Z_L$ and said plane being defined in accordance with the equation: $y_B = -F \tan \alpha$ such that a beam projected in said plane is reflected back in the same plane and onto the image plane at row $-F \tan \alpha$.

Preferably said occlusion type processing step processes said obtained image data into an array of peaks of peak pixel data, each said peak substantially representing the centre of a said stripe received by said detector.

Preferably said occlusion type processing step comprises the steps of:

searching said peaks in said array for discontinuities; and creating an occlusion map through identifying and labelling said discontinuities as at least being of a first type or of a second type of discontinuity.

Preferably said occlusion map is used to define boundaries for use in indexing said stripes, said indexing using said boundary information and said stored classification.

Preferably said indexing step is configured to process said peak pixel data in accordance with steps comprising:

(a) selecting a start position in said peak pixel data and initialising a stripe index count for said selected stripe;

(b) tracing the current stripe in a first direction along said stripe until a said first boundary condition is met;

(c) returning to said start position and tracing said current stripe in the opposite direction to said first direction until a said boundary condition is met;

(d) increasing the stripe index and moving to the next stripe in a third direction, said third direction substantially perpendicular to said first and second directions, and repeating steps (b) and (c);

(e) repeating step (d) until a second boundary condition is met; and (f) returning to said start position and repeating steps (d) and (e), but moving in a fourth direction, said fourth direction being substantially 180° from said third direction, and decreasing said stripe index each time.

Preferably said indexing step comprises processing said peak pixel data in accordance with a flood fill recursive processing routine.

Preferably said indexed stripes are used to reconstruct a 3D surface of a scanned physical entity.

According to a third aspect of the present invention there is provided a 3D scanning apparatus configured to image a physical entity, said apparatus comprising:

a radiation projector for projecting a plurality of radiation stripes onto said physical entity;

a detector for detecting said striped radiation received from said physical entity; and a data storage device for storing said received radiation as a pixellated bitmap image;

said apparatus characterised in that said physical entity, said radiation projector and said detector are geometrically arranged to constrain the number of times that each said received stripe is permitted to occur in a given pixel row of said bitmap.

According to a fourth aspect of the present invention, there is provided in a 3D scanning apparatus configured to image a physical entity, said apparatus comprising a radiation projector for projecting a plurality of radiation stripes onto said physical entity, a detector for detecting said striped radiation received from said physical entity and a data storage device for storing said received radiation as a pixellated bitmap image, a method of imaging characterised in that:

said physical entity, said radiation projector and said detector are geometrically arranged to constrain the number of times that each said received stripe is permitted to occur in a given pixel row of said bitmap.

According to a fifth aspect of the present invention there is provided a 3D scanning apparatus configured to image a physical entity, said apparatus comprising:

a radiation projector for projecting a plurality of radiation stripes onto said physical entity;

a detector for detecting said striped radiation received from said physical entity; and a data storage device for storing said received radiation as a pixellated bitmap image;

said apparatus characterised in that said physical entity, said radiation projector and said detector are geometrically arranged so that each said received stripe is permitted to occur only once in a given pixel row of said bitmap.

According to a sixth aspect of the present invention there is provided a 3D scanning apparatus configured to image a physical entity using a plurality of stripes, said apparatus comprising:

a radiation projector for projecting radiation onto said physical entity;

a detector for detecting said striped radiation received from said physical entity; and a data storage device for storing said received radiation as a pixellated bitmap image, said apparatus configured in accordance with a predefined geometrical arrangement, wherein:

said predefined geometrical arrangement comprises a constraint such that each said received stripe can only occur a predetermined number of times in a pixel row of said bitmap.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 1 is a view along the Y axis and FIG. 2 is a view along the $X_L$ axis, FIG. 2 illustrating the so called "Common Inclination Constraint" of the present invention;

FIG. 11 schematically illustrates, in accordance with the methods of the present invention, an example of connecting occlusion points so as to enable correct stripe indexing;

FIG. 13($a$), the figure on the left, schematically illustrates typical connectivity errors at points A, B and C;

FIG. 13($b$), the figure on the right, schematically illustrates, in accordance with the occlusion detection methods and the apparatus as configured in accordance with the present invention, correction of the connectivity errors illustrated in FIG. 13($a$); and FIG. 14: schematically illustrates a table detailing numerical analysis of correspondence between template and automatic models, with and without the occlusion boundaries. The starting point is at (0,0).

DETAILED DESCRIPTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

To avoid the problems associated with 3D multi-stripe imaging systems of the type discussed earlier, in accordance with the present invention, the projection of the radiation being used is simplified as a uniform stripe pattern, and, as described in detail below, novel methods for correctly indexing the stripes are developed, including provision of a common inclination constraint for constraining the geometry of the scanning apparatus and provision of an occlusion classification to be used in indexing the stripes so as to correct wrongly connected or unconnected stripe portions. Detailed definitions of patches and the continuity of stripes are given and experimental results concerning the success of the methods employed are provided. Using the methods and apparatus as configured in accordance with the present invention eliminates the need for coding, and reduces the accuracy required of the projected pattern. Furthermore by dealing with stripe continuity and occlusions in accordance with the methods of the present invention, general methods are provided which have relevance to many structured light problems and various kinds of other imaging methodologies.

In accordance with the following disclosure an examination is made as to how far the correspondence problem can be solved with uncoded stripes, where the correct order of stripes in the captured image is determined by various preferred processing routines that have been configured in accordance with the present invention. Each captured frame will therefore provide a complete data model for a patch on the surface of the target object.

In part 1 the system is described, showing the dependence between the stripe index and the measurement of a surface point, and a preferred "common inclination constraint" geometry is defined. In part 2 the continuity of stripes and the boundaries between continuous patches are defined, and two algorithms for implementation as processing routines are designed each of which indexes a sequence of corresponding stripes. In part 3 an occlusion classification is given to improve the validity of the boundaries, and a further connectivity algorithm is described. In part 4, the index is compared to a template sequence, created by hand using prior knowledge to ensure an exact correspondence with the projected sequence. The results of implementing both types of processing routine, with and without dealing with occlusions, are presented.

1. Description of a Preferred Embodiment of the System

Figure 1:
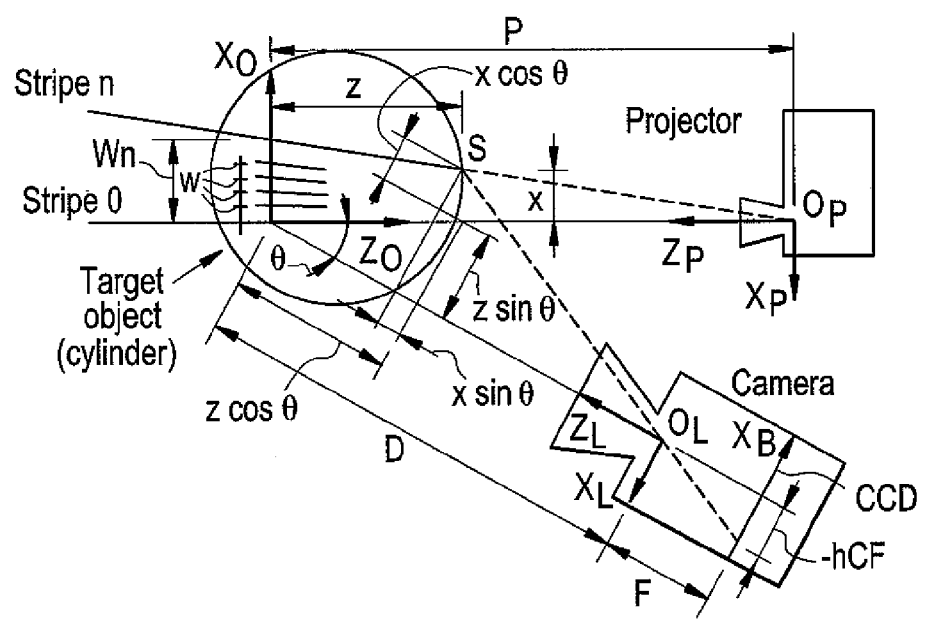
FIGS. 1 and 2 schematically illustrate a scanning apparatus comprising a projector and a camera as set up and constrained in accordance with the present invention.

The scanning apparatus is schematically illustrated in plan view in FIG. 1. Evenly spaced, vertical (i.e. parallel to the Y axes) stripes are projected which intersect the $X_O$ axis, and the distance between intersections is W. A point s=(x,y,z) on the surface of the target object reflects a beam (shown dotted) in stripe n through the camera lens at $O_L$ and onto the image plane. This light is sensed at (h,v) in the camera CCD array, measured to an accuracy better than one pixel by the subpixel estimator defined later in this section. The relation between the CCD pixel array and the spatial image plane is given by $x_B$=hCF, $y_B$=vCF, where F is the focal length of the camera and CF is the spatial size of one square pixel. P and D are the distances from the origin $X_0 Y_0 Z_0$ to the centres of the projector and camera lens respectively. θ is the angle between the Z axes of the camera and projector.

The parameters of s are given by the scanning function scan (h,v,n)=(x,y,z)

$$x = Wn - z\frac{Wn}{P} \quad (2.1)$$

$$y = vC(z\cos\theta - D) \quad (2.2)$$

$$z = \frac{DhC + Wn(\cos\theta + hC\sin\theta)}{hC\cos\theta - \sin\theta + \frac{Wn}{P}(\cos\theta + hC\sin\theta)} \quad (2.3)$$

where h and v give the position of the sensing pixel and n is the index of the stripe containing the sensed beam. The constants W, P, D, C and θ are found by calibration. Note that, by construction, P is never equal to zero.

Hence it can be seen that successful measuring of the target surface is dependent upon correctly determining the index n of each stripe appearing in the image.

Figure 2:
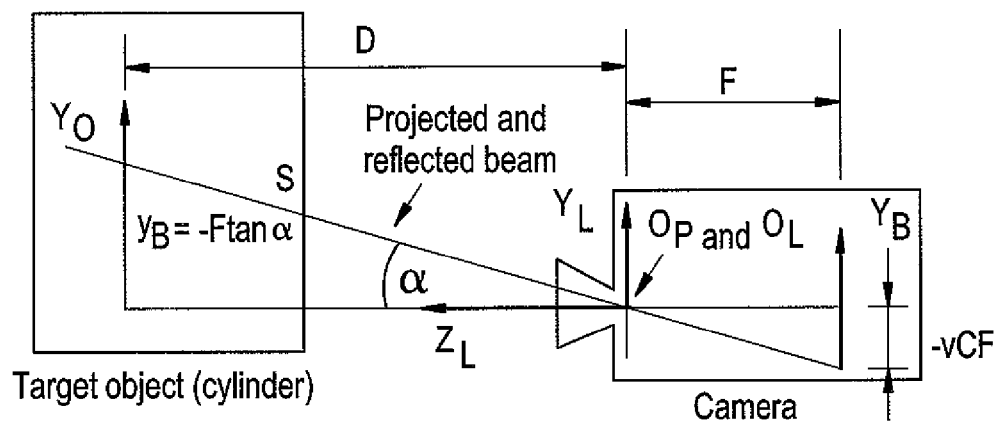

FIG. 2 schematically illustrates the apparatus of the system of FIG. 1 as viewed "sideways", i.e. down the $X_L$ axis. In order that parametric equations 2.1, 2.2 and 2.3 are correctly formulated, the projector and camera are aligned "horizontally", so that axes $Z_O$, $Z_P$, $Z_L$, $X_O$, $X_P$ and $X_L$ are all in the same plane.

In the preferred embodiment these axes are axes of Cartesian co-ordinate frames, but as will be understood by those skilled in the art, other forms of co-ordinate frames could be used. In the preferred set of co-ordinate frames, the co-ordinate axes $Z_O$, $Z_P$, $Z_L$ are substantially parallel and co-ordinate axes $X_O$, $X_P$ and $X_L$ are substantially parallel.

In the best mode contemplated, the geometrical constraint comprises configuring the co-ordinate axes $Z_O$, $Z_P$, $Z_L$, $X_O$, $X_P$ and $Z_L$ to all lie in substantially the same plane.

The Common Inclination Constraint

The system is further constrained by positioning the projector so that its origin $O_P$ lies on the $X_L$ axis of the camera. FIG. 2 shows that $O_P$ and $O_L$ will now both lie on a plane $y_B$=−F tan α, inclined at angle α to $Z_L$. A beam projected in this plane to surface point s will be reflected back in the same plane and onto the image plane at "row" −F tan α. If it is assumed that any beam can only be reflected at one surface point, and that any stripe can only contain one beam at a specific inclination, it follows that each stripe can be sensed at only one position in any "row" in the image plane. This is only true when the system is constrained so that the projected and reflected line of a beam always shares a "common inclination", hence the name common inclination constraint.

Figure 3:
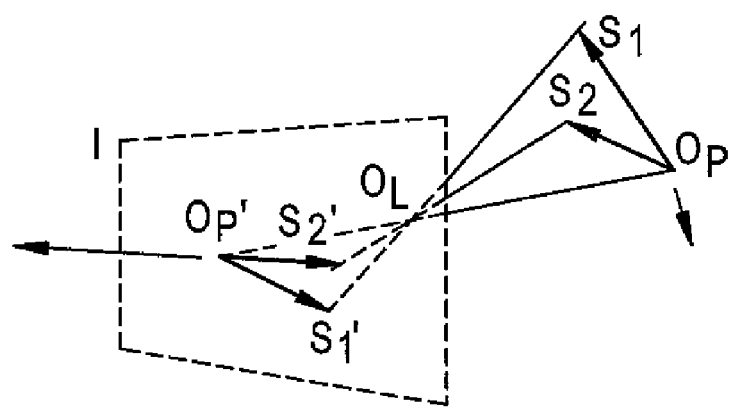
FIG. 3 schematically illustrates another view or representation of the Common Inclination Constraint illustrated in FIG. 2.

Another view of this constraint is illustrated schematically in FIG. 3. In FIG. 3 consider beams from $O_P$ striking the surface at $S_1$ and $S_2$. Lines $O_P$ to $S_1$ and $O_P$ to $S_2$ are projected through the lens at $O_L$ and onto the image plane/as lines $O_P'$ to $S_1'$ and $O_P'$ to $S_2'$. If $O_P$ follows the arrow to where line $O_P$ to $O_L$ is parallel to image plane I, its "image" $O_P'$ will move towards infinity, and all lines $O_P'$ to $S_n'$ will be parallel. Therefore, if all stripes are considered as a bundle of beams emanating from the unique projection point $O_P$, then it follows that every beam path will appear to be parallel when viewed from the image plane.

A 3D scanning apparatus configured in accordance with the present invention to image a physic entity using a plurality of stripes may thus comprise a radiation projector for projecting radiation onto the physic entity and a detector for detecting the stripes radiation received from the physical entity. The detector, and structured light systems, suitably comprises a video camera and the radiation projector suitably comprises a structured light project. The detector itself or a unit attached thereto is configured to store the received radiation as a pixellated bitmap image and, as discussed above, the apparatus is configured in accordance with a pre-defined geometrical arrangement such that the arrangement puts a constraint on stripes received in that they can only occur a pre-determined number of times in a pixel row of the bitmap. In the preferred embodiment described above the received stripe may occur only once in a pixel row of the bitmap. This enables stripes to be used in scanning that are uniform uncoded stripes.

In the best mode the invention utilizes a CCD sensor. However other suitably configured light sensing devices could potentially be used as will be understood by those skilled in the art. Whatever type of sensing device is used the radiation projector, the physical entity being imaged and the radiation detector are geometrically arranged such that the arrangement of these devices constrains the number of times that each received radiation stripe is permitted to occur in a given row of the bitmap of the received radiation. The normal subdivision of pixels into rows is a convenient subdivision of pixels in the sensor to utilise. However other predefined sets of pixels could be used. Thus in this sense the meaning of the word "row" is not to be considered as limited to either a horizontal array of pixels or to a consecutive sequence of pixels. Depending on the geometrical arrangement adopted a vertical array (a column), for example, could be used. As will be understood from FIGS. 1 to 3 and the associated description thereof the term "row" is to be interpreted as including any set of pixels in the sensor device such that each pixel in the set is coincident with the plane which is normal to the plane of the central radiated stripe in the best mode contemplated the pixels in a given such set comprise a consecutive sequence of pixels in the CCD sensor and this is conveniently provided by a conventional row of pixels (or a column if the apparatus is configured to work such that a vertical sequence of pixels constitutes the required arrangement of a set of pixels).

Processing the Image Data

A suitably configured scanning system as configured in accordance with a preferred embodiment of the present invention uses a standard monochrome video camera synchronised to the PAL standard, at a bandwidth of 5.5 MHz. The data is presented to the system processors as a C×R array $A_B$ of discrete brightness levels where $a_B \in [0, 255]$, and the array is situated in the sensing plane of the camera.

Figure 4:
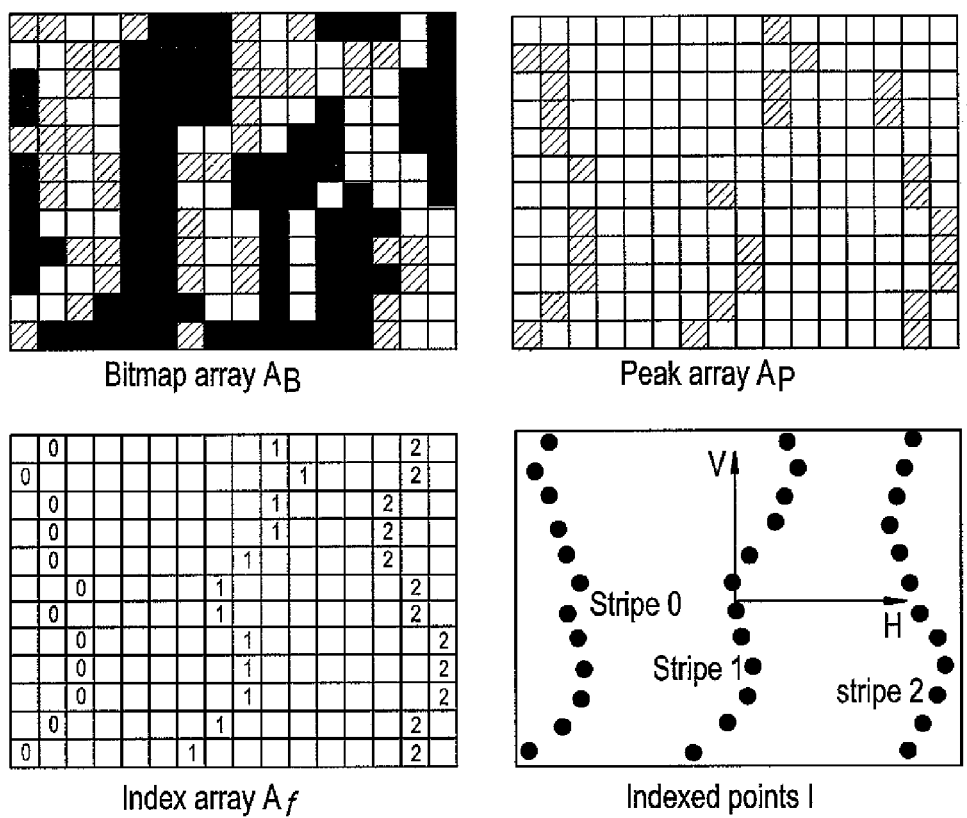
FIG. 4 schematically illustrates, in accordance with the present invention, steps involved in processing the pixellated bitmap array obtained using a scanner as configured in accordance with the present invention and, in particular, includes the step of creating a peak data array.

FIG. 4 schematically illustrates, in accordance with the present invention, steps involved in processing the pixellated bitmap array obtained using a scanner as configured in accordance with the present invention and, in particular, includes steps for creating a peak data array. Referring to FIG. 4, from the bitmap array $A_B$ where $f(c,r)=a_B$, a peak array $A_p$ is created of local horizontal maxima, i.e. peaks at the centre of each stripe, where:

$$a_P = \begin{cases} \text{TRUE} & \text{if } f(c-1, r) \leq f(c, r) < f(c+1, r) \\ \text{FALSE} & \text{otherwise} \end{cases} \quad (2.4)$$

The indexing algorithms then use the peaks array $A_P$ to label each peak with a stripe index array $A_I = C \times R \times N$ where n is either a stripe index or "NULL" (shown blank). To provide h, v and n for the scan( ) function, a further data type $I = H \times V \times N$ is created using a subpixel estimator spe(c,r)=(h,v) with a design similar to those used by R. B. Fisher and D. K. Naidu (1996) A Comparison of Algorithms for Subpixel Peak Detection, in Sanz (ed.) Advances in Image Processing, Multimedia and Machine Vision, Springer-Verlag, Heidelberg (fis 96a).

2. Stripe Indexing

The discrete bitmap image on the sensing plane is a square tessellation of pixels, each pixel representing a square with four corners and four sides.

Definition 1 Pixels P and Q are called direct neighbours (d-neighbours) if they share a side, and indirect neighbours (i-neighbours) if they share one and only one corner.

Figure 5:
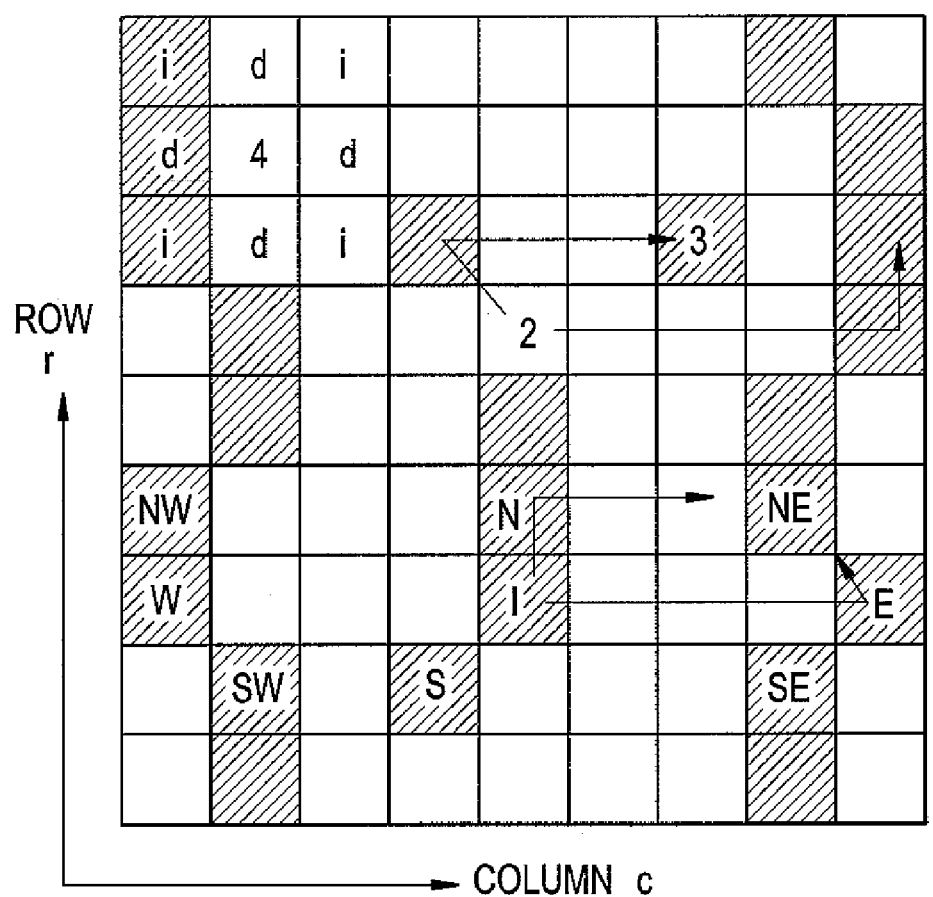
FIG. 5 schematically illustrates, in accordance with the present invention, examples of moving around the peaks data of a peak data array of the type illustrated in FIG. 4.

As all pixels in the captured image are situated in a two dimensional Euclidean plane, then each pixel may have maximally eight neighbours (four direct and four indirect) as seen in FIG. 5, at position 4.

We now refer to the peaks array $A_P$ in which pixels are marked as TRUE if they are peaks (shown grey in FIG. 5).

Definition 2 A northern neighbour (n-neighbour) of a current peak is defined as a d- or i-neighbour in the row incremented by one. A southern neighbour (s-neighbour) of a current peak as a d- or i-neighbour in the row decremented by one.

Definition 3 A western neighbour (w-neighbour) is defined as the nearest peak In the same row which has a lesser column index. An eastern neighbour (e-neighbour) is defined as the nearest peak in the same row which has a greater column index.

The maximum distance to the "nearest" peak will be defined by an estimation of the greatest likely separation of two consecutive stripes. The definition of i-neighbours assumes that the stripe cannot move laterally by more than one pixel as it moves up or down, i.e. that the "slope" of the stripe is never less than 45°. This will not be true in practice but, in common with our general approach it will create extra boundaries rather than wrongly connected stripes.

FIG. 5 schematically illustrates, in accordance with the present invention, examples of moving around peak data of a peak data array of the type illustrated schematically in FIG. 4. FIG. 5 shows, relative to peak 1, its n-neighbour N, its s-neighbour S, its w-neighbour W and its e-neighbour E.

Definition 4 A continuous stripe is a sequence of distinct peaks $\{P_1, P_2, \ldots, P_n\}$ such that each peak in the sequence $\{P_1, P_3, \ldots, P_{n-1}\}$ has one and only one northern neighbour. Consequently sequence $\{P_2, P_3, \ldots, P_n\}$ has one and only one southern neighbour.

Definition 5 A patch is a subset of $A_P$, maximally possible, i.e. its peaks can be arranged in a maximal number of successive continuous stripes.

Boundary peaks are created by a set of conditions which are tested at each position in the peaks data. The test assumes that a valid position must have valid adjacent positions. In FIG. 5, starting at position 1, position NE can be found by moving north and east, or by moving east and north. Similar tests are performed in the south-east, north-west and south-west directions. From position 2 moving north and east arrives at a different position from moving east and north. Position 2 is therefore marked as a boundary, caused by the disconnected peak at position 3.

In order to index the stripe peaks and mark boundaries, two preferred embodiments of algorithms for implementation in indexing processing routines have been designed: the stripe tracer and the flood filler.

Figure 6:
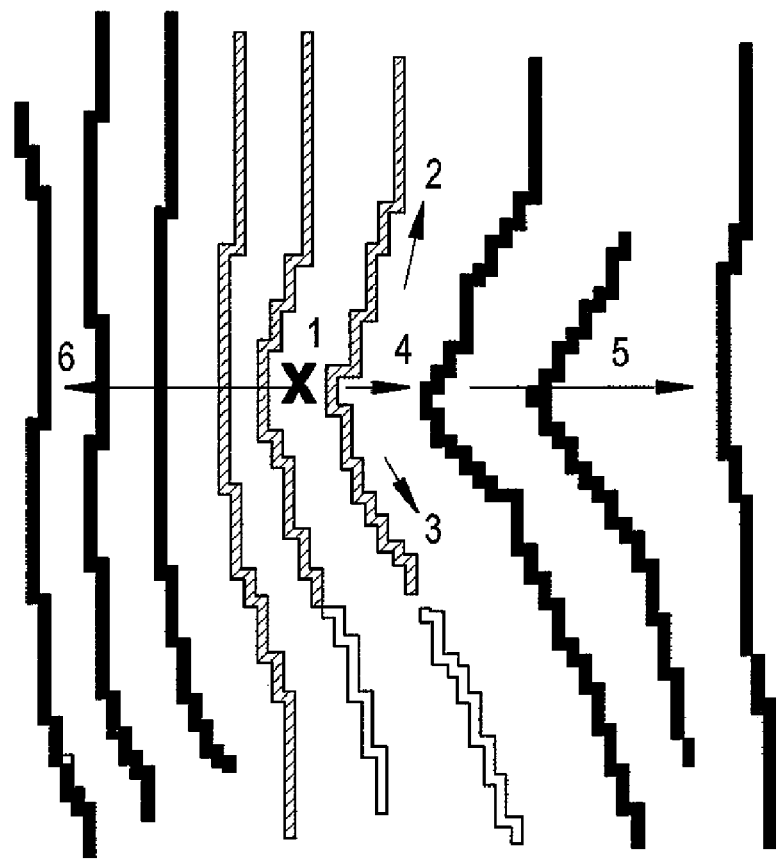
FIG. 6 schematically illustrates, in accordance with the present invention, the effect of a preferred embodiment of an indexing processing routine (the stripe tracer algorithm) to index the stripe peaks.

FIG. 6 schematically illustrates, in accordance with the present invention, the effect of the stripe tracer processing routine used to index the stripe peaks. The sequence of operations for the stripe tracer algorithm, shown in FIG. 6 is:

1. Find a start position in the peaks data space. Set the stripe index to zero. The start point can be found by hand or automatically;
2. Trace the current stripe northwards until a boundary condition is met;
3. Return to start and repeat 2 moving southwards;
4. Increase the stripe index, move to the next peak eastwards and repeat steps 2 and 3;
5. Repeat step 4 until boundary condition is met; and
6. Return to start and repeat steps 4 and 5 moving westwards, decreasing the stripe index each time.

The disadvantage of this process is that once a boundary has been reached, the stripe will not be "picked up" again, as can be seen from the lower part of the two middle stripes. Therefore some valid stripes in the continuous surface will be lost. To address this problem a second algorithm for implementation in a data processing routine has been devised to perform a more thorough search for valid stripes: the flood filler.

The flood fill recursive function is a known class of algorithm used in graphics software. It has been extensively adapted for use in implementation of the present invention as regards passing parameters of stripe, row, heading and index. In pseudocode it may be expressed as follows:

```
flood(stripe, row, heading, index) {
    if(heading==NORTH) goNorth( );
    if(heading==SOUTH) goSouth( );
    if(heading==EAST) goEast( ); index++;
    if(heading==WEST) goWest( ); index--;
    if(boundary || alreadyIndexed) return;
    indices[stripe][row] = index;
    flood(stripe, row+1, NORTH, index);
    flood(stripe, row-1, SOUTH, index);
    flood(stripe+1, row, EAST, index);
    flood(stripe-1, row, WEST, index);
```

Figure 7:
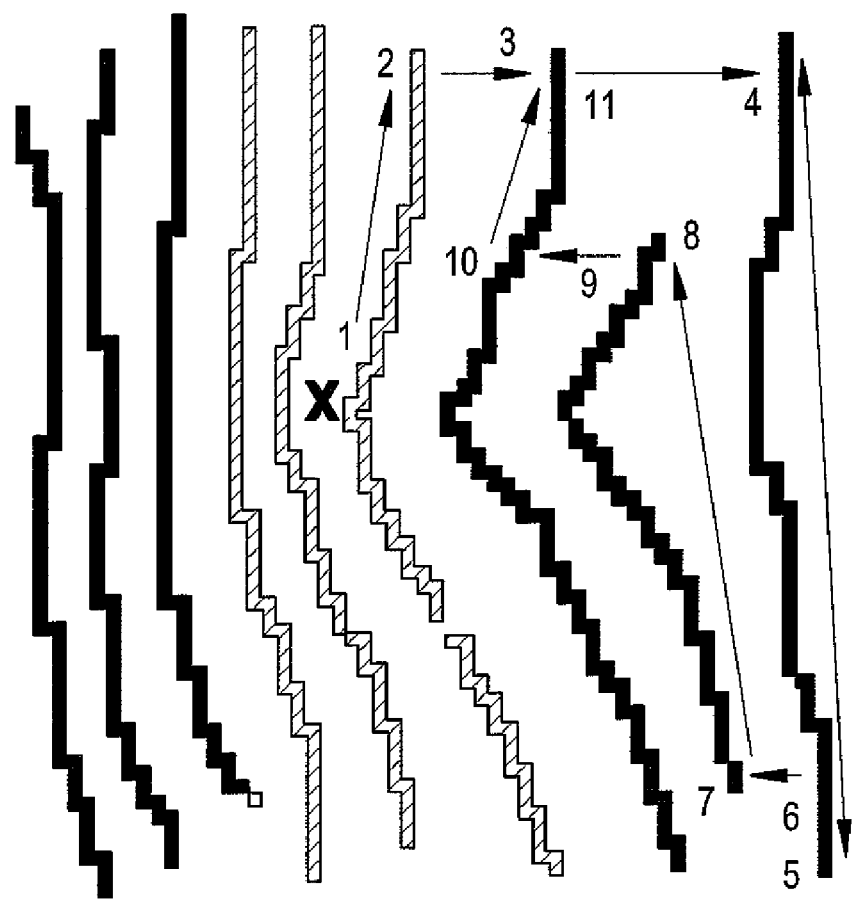
FIG. 7 schematically illustrates, in accordance with the present invention, the effect of a preferred embodiment of an indexing processing routine (the flood filler algorithm) to index the stripe peaks.

FIG. 7 schematically illustrates in accordance with the present invention the effect of the second preferred embodiment of an indexing processing routine (that of the flood filler detailed above) to index the stripe peaks.

The flood filler will move north if boundary conditions allow, otherwise east, otherwise south, or finally west. If it cannot move in any direction, the current floods function is taken from the stack revealing the parameters of the previous position and this is repeated until a previous position is returned to which has a valid move. In FIG. 7 when the algorithm arrives at 5 it cannot move, and peels back until it arrives at previous position 6, whence it can move west to 7. A processing routine using the flood filler approach will index the stripes missed in FIG. 6, the stripe tracer.

3. Dealing with Occlusions

A scanning apparatus configured in accordance with the geometrical constraint defined earlier provides an occlusion classification usable by the system. Various types of occlusions may be stored in electronic memory as a classification that may be referred to and utilised by an occlusion type processing means configured to detect the occlusions in the received image data.

The tests in Section 4 (see later) show that connectivity algorithms implemented as processing routines produce some indexing errors, typically by connecting peaks which are from different stripes. These errors are often caused by occlusions. An occlusion is an obstruction, and in a scanning system configured in accordance with the present invention there are two types: a projector occlusion and a camera occlusion.

Figure 8:
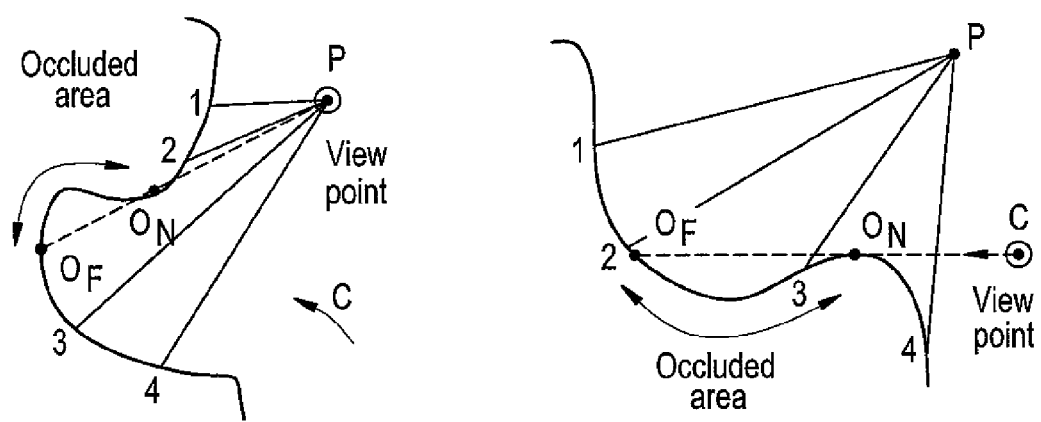
FIG. 8 schematically illustrates known Projector and Camera (detector) type Occlusions required for understanding the present invention in relation to classifying occlusion types.

FIG. 8 schematically illustrates known projector and a camera (detector) type occlusions required for understanding the present invention in relation to classifying occlusion types.

In FIG. 8 (left), four stripes radiate from the projector origin at P, and illuminate the surface at positions 1, 2, 3 and 4. In the Figure we draw a dashed line from P which grazes the surface at point $O_N$, and continues to point $O_F$, where the line intersects the surface at a second point. This line we call a supporting line, which for a smooth surface will be tangential. The part of the surface between ON and OF is an occluded area, shaded from the projection point P. We call ON a near occlusion point and $O_F$ a far occlusion point Note that an actual beam can only strike the surface at or close to one of these two points.

FIG. 8 (right) again shows four stripes cast onto a surface, and a supporting line from the camera origin C to near occlusion point $O_N$ and far occlusion point $O_F$. Here the occluded area is that part of the surface which is hidden from the camera view. Therefore, importantly, the viewpoint for the camera occlusion is the camera origin, and the viewpoint for the projector occlusion is the projector origin.

Definition 6. A near occlusion point is a point on the surface of the target object, such that a straight line from that point to the viewpoint is supporting to the surface at the near occlusion point.

Definition 7. A far occlusion point is a point on the surface of the target object, such that a straight line from that point to the viewpoint will support the surface at a near occlusion point.

Occlusion Boundaries

Figure 9:
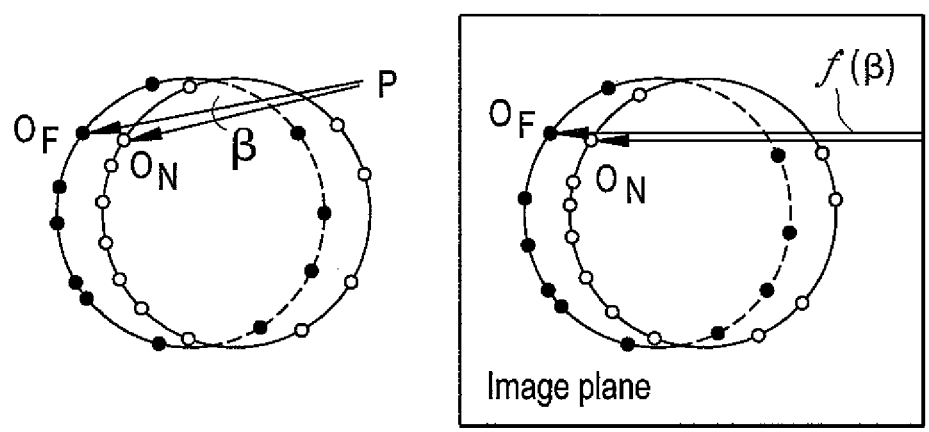
FIG. 9 schematically illustrates types of occluded areas with respect to a projector and a camera required for purposes of understanding the present invention, the figure showing that the viewpoint for a camera occlusion is the camera origin and the viewpoint for the projector occlusion is the projector origin.

FIG. 9 provided for the purposes of understanding of the present invention schematically illustrates types of occluded areas with respect to a projector and a camera. FIG. 9 demonstrates that, in accordance with the geometrical constraints of the present invention, that the view point of a camera occlusion is the camera origin and the view point of the projector occlusion is the projector origin.

FIG. 9 (left) shows a target object, a circular button protruding from a flat surface, lit by two light beams in the same stripe plane, where the angle β between the beams is very small. One beam strikes the surface at a near occlusion point $O_N$, denoted by a ring, the other at a far occlusion point $O_F$, denoted by a black disc. We see an occluded area shaded grey which is defined by a set of near and far occlusion points (rings and disks) lying on the occlusion boundary. This shaded area is the result of a projector occlusion, but there is a second occluded area to the right of the dotted line, caused by a camera occlusion, and this hides some of the projected light from the projector view.

FIG. 9 (right) shows the same target object, viewed in the image plane of the camera, when the system is set up with the Common Inclination Constraint. We recall that with this constraint the beams appear to run in parallel directions, which means that $O_F$ will be translated laterally from $O_N$ but will be vertically very close (a function of the angle β).

Occlusion of Projected Stripe Patterns

Figure 10:
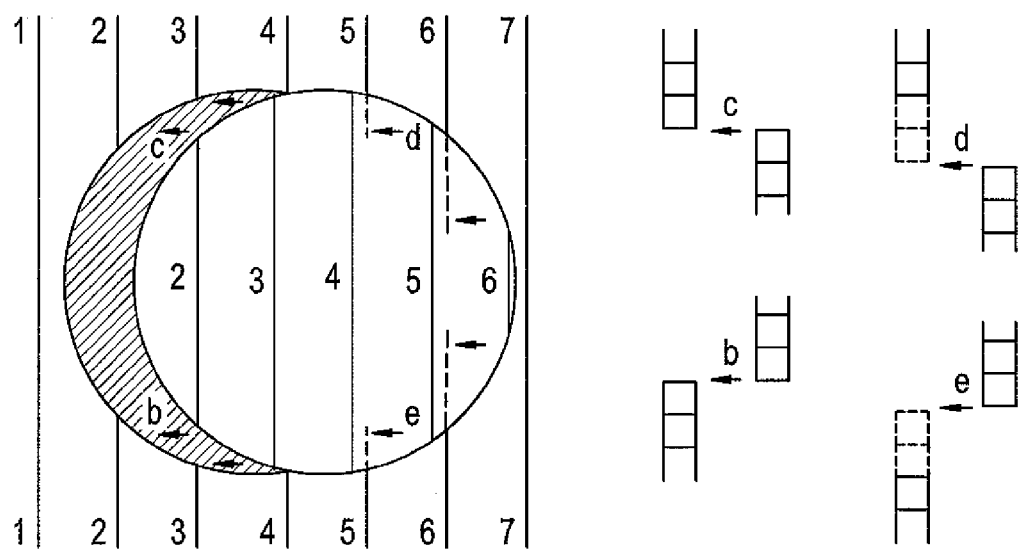
FIG. 10 schematically illustrates, in accordance with the present invention, a classification for four classes of typical occlusions in relation to the associated stripe disturbances thereby caused.

We can extend these observations to look at stripe patterns on a target surface. FIG. 10 schematically illustrates a classification for four classes of typical occlusions in relation to the associated stripe disturbances thereby caused, the classification representing the possible occlusion types that may arise in a scanning system as configured in accordance with the present invention. FIG. 10 shows the target object of FIG. 9, this time lit by a stripe pattern, indexed from 1 to 7. Position c repeats the situation in FIG. 9, where we can assume that two adjacent beams from stripe 2 strike the surface close to an occlusion and are translated laterally. Similar situations occur at b, d and e.

In FIG. 10 (right) parts of the object are magnified to pixel level, and four typical situations are classified:

at (b) a low projector occlusion (l.p.o.);
at (c) a high projector occlusion (h.p.o.);
at (d) a high camera occlusion (h.c.o.); and
at (e) a low camera occlusion (l.c.o.).

Extending Connectivity to Deal with Occlusions

We can now add further rules to our connectivity algorithms, using the cases derived from FIG. 10. Firstly, a new data set is created from the peak array $A_P$, called the occlusion array, $A_O$ with elements:

$$a_O = \begin{cases} N & \text{if } \neg (p(c, r)) \\ D & \text{if } \neg (p(c-1, r-1) \vee p(c, r-1) \vee p(c+1, r-1)) \\ U & \text{if } \neg (p(c-1, r+1) \vee p(c, r+1) \vee p(c+1, r+1)) \\ C & \text{otherwise} \end{cases} \quad (2.5)$$

Thereby peaks, i.e. TRUE pixels, are labelled as disconnected going up (U), disconnected going down (D), or connected (C). Non peaks are denoted as N.

FIG. 11(a) shows a practical example of connectivity, using $A_O$ and the cases shown in FIG. 10. From the D peak at position 1 we look for U peak complying with case b, c, d or e. Note that we can cross fully connected stripes in our search.

In FIG. 11(b) we have found our U peak at position 2, corresponding to a high camera occlusion (case d). The occlusion boundary is drawn as a dotted line connecting the D peak with the U peak. This occlusion line now crosses a seemingly connected stripe, and we therefore know that this is a falsely connected stripe, and that there must be a break approximately in the region of the occlusion line. We therefore mark U and D peaks at positions 3 and 4.

We can see intuitively that a correct indexing should now give us three stripes, where the stripe ending at 1 resumes at 3, and the stripe broken at 4 resumes at 2. The indexing algorithms should find these connections now that the new occlusion boundaries are known, and preliminary results show some success.

4. Experimental Results

In this section we present the results of implementation of both algorithms. As a target object we use a sculpted head, 200 mm. high. We project 200 black and 200 white stripes into the camera viewing volume, which equates to a spacing of 6 pixels between white peaks. The theoretical limit is 2 pixels, i.e. one white pixel and one black pixel, although this would result in unresolvable spacing at surfaces which are oblique to the camera. The results use a maximal test set within this 6 pixel spacing, and future work will reduce the spacing minimum.

The above procedures will produce patches of surface considered by the system to be valid. To measure the success of the two algorithms we compare a produced data set with a previously created template. To create the template, a copy of the bitmap image is marked by hand so that the system will provide a data set which is judged to be correct by eye using prior knowledge of the target surface.

Figure 12:
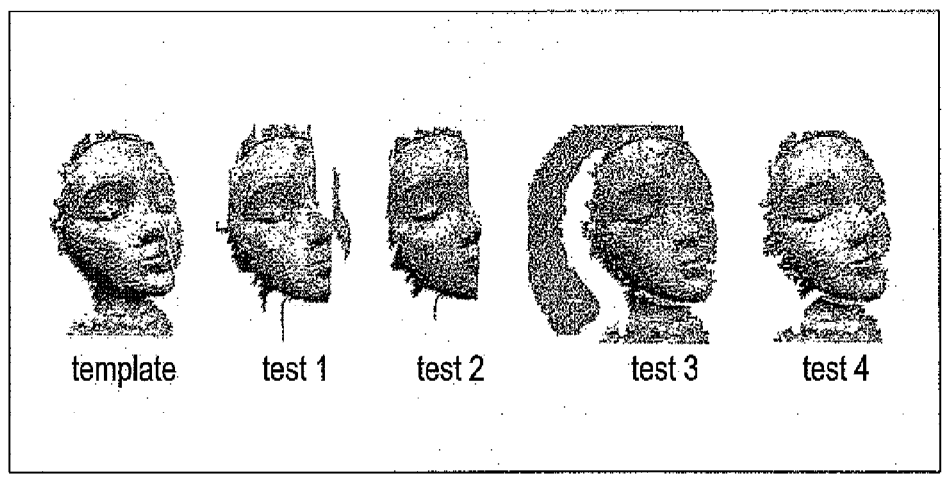
FIG. 12 illustrates patches of a test surface obtained using the indexing processing routines as implemented in accordance with the present invention. Patches of a template and four tests are shown, tests 1 and 2 being of the stripe tracer routine and tests 3 and 4 being of the flood filler routine (see table in FIG. 14)

FIG. 12 illustrates resultant patches obtained for a test surface. The patches were obtained using the aforementioned indexing processing routines as implemented in accordance with the present invention. Patches of a template and four tests are shown, tests 1 and 2 being of the stripe tracer routine and test 3 and 4 being of the flood filler routine.

It can be seen from FIG. 12 that the flood filler (tests 3 and 4) covers a larger patch than the stripe tracer (tests 1 and 2). This observation is evaluated in the table shown in FIG. 14. The tests show that errors occur due to miscorresponding and noncorresponding peaks.

We recall from Section 1 the array $A_I$ of index values (either a stripe index or "NULL") for a pixel at position (c,r) in the bitmap image. Function t(c,r) gives the index of pixel (c,r) in the template, and a(c,r) the index of the pixel in the same position in the index array produced by the automated algorithms. We then produce the following sets:

C, "corresponding indexed peaks", i.e. the number of elements where the peaks have the same index. Peak (c,r) $\in$ C such that:

$(t(c,r)=a(c,r))\hat{}(a(c,r)\neq NULL)$

M, "miscorresponding indexed peaks", i.e. the number of elements where the peaks have different indices. Peak (c,r) $\in$ M such that:

$(t(c,r)\neq a(c,r))\hat{}(a(c,r)\neq NULL)\hat{}(t(c,r)\neq NULL)$

X, "noncorresponding indexed peaks", i.e. the number of elements where a false peak is found. Peak (c,r)$\in$X such that:

$(a(c,r)\neq NULL)\hat{}(t(c,r)=NULL)$

These comparisons are presented in the table shown in FIG. 14. It can be seen that the stripe tracer (test 1) gives a smaller total patch (21347 peaks) but with much greater correspondence to the template than for the flood filler (test 3) which covers a greater area (45641 peaks) but with many more differences from the template (5188+14333 peaks).

These tests are then repeated (tests 2 and 4) when the occlusion boundaries are added to the algorithm conditions. A common connectivity error is seen in FIG. 13(a), where stripes are shown as connected at A, B and C when, with prior knowledge, we know that a boundary exists, caused by an occlusion. These connectivity errors at A, B and C are corrected using occlusion detection and the results are shown in FIG. 13(b) with the "correct" indexing at A, B and C. The "correctness" is measured in the tests tabulated in the table of FIG. 14.

FIG. 14 details, in table form, numerical analysis of correspondence between template and the automatic models, with and without the occlusion boundaries. The starting point is at (0,0).

It can be seen from the table in FIG. 14 that for the stripe tracer the mis- and noncorresponding peaks are reduced to zero when occlusion boundaries are included. In addition, the occlusion boundaries prevent the more pervasive flood fill algorithm from finding non-corresponding peaks (14333 peaks reduced to 31).

5. CONCLUSIONS

Using the apparatus and methods of the present invention it is clear from the results given above that bounded patches can be created which accurately model the surface of part of a target object, using a uniform stripe scanning system. To achieve this we have defined system constraints such as the common inclination constraint, to simplify the indexing algorithms. We have then defined stripe continuity, patches and boundaries on the target surface. We have shown, in the tests against a template, that each of these factors contributes to the successful scanning of the target object.

An open issue is the complexity of the algorithms. The estimated upper bound of the stripe indexer algorithm is $O(n^2)$ where n is the maximum number of rows in the bitmap image. This value can be improved. The complexity of the flood filler algorithm is under investigation.

A comparison of the flood filler and stripe tracer algorithms shows that greater correspondence can be achieved with an algorithm which has more constrained boundary tests and therefore creates a smaller patch. Our current algorithms follow the principle of "greater constraint and smaller patches".

The addition of boundaries deduced from the likely position of occlusions has been added to the indexing algorithms, which have further increased the contribution of correctly corresponding peaks, while reducing the overall patch size. These results are important for solving the indexing problem and provide a robust and significant contribution to the creation of accurate patches.

As regards to the preferred embodiment of the present invention, to summarise the following main stages are involved:

The apparatus is set up in a specific geometry so that in the video image each stripe can appear only once in a particular row. This "rule" is then fed into the occlusion classified;

Occlusion Classification
  Occlusions (such as areas around an imaged human nose (are one of the main problems. In accordance with the present invention a unique classification is devised which involves the common inclination constraint rule. From this four occlusion classes are obtained which can be observed in the stripe image;

Occlusion Map
  The occlusion classes obtained are then mapped into a new image space and the resultant image data is fed into the indexing algorithms;

Indexing Algorithms
  The stripe image is then analysed again, and using the fact that the occlusions have been marked (for example on the nose) a stripe indexing routine is then executed. The stripe indexing routine searches the image for connected stripes and presents a map of index stripes (see FIGS. 6 and 7) which can then be used to measure the surface.

As has been indicated previously, these 4 processes are consequential upon each other.

It will be understood by those skilled in the art that the methods and techniques described herein may find useful application in a wide variety of imaging systems. Thus the methods and techniques and apparatus described are not to be considered as limited to structured light scanning systems. Thus scanning systems that use other types of radiation may find useful application of the methods and techniques described herein.

It is also to be understood by those skilled in the art that many of the processing functions described in relation to the invention may be implemented in software (as computer programs) or as hardware or firmware.

The invention claimed is:

1. A 3D scanning apparatus configured to image a physical entity, said apparatus comprising:
   a radiation projector for projecting a plurality of radiation stripes onto said physical entity;
   a detector for detecting said striped radiation received from said physical entity; and
   a data storage device for storing said received radiation as a pixellated bitmap image comprising a plurality of rows;
   said apparatus characterised in that said physical entity, said radiation projector and said detector are geometrically arranged to constrain the number of times that each said received stripe is permitted to occur in a pixel row of said bitmap, said geometrical constraint determining an occlusion classification comprising a plurality of stored types of occlusions and said apparatus additionally comprising an occlusion type processing means for detecting said types of occlusions in said received image data.

2. An apparatus according to claim 1, wherein said radiation projector utilises visible wavelength electromagnetic radiation and said detector is configured to detect visible light.

3. An apparatus according to claim 1, wherein said geometrical constraint restricts said predetermined number of times to once per row.

4. An apparatus according to claim 1, wherein said stripes are uniform uncoded stripes.

5. An apparatus according to claim 1, wherein:
   said physical entity is spatially defined with respect to a Cartesian coordinate frame $(X_O, Y_O, Z_O)$;
   said projector has origin $O_P$ in a Cartesian coordinate frame $(X_P, Y_P, Z_P)$; and
   said detector has origin $O_L$ in a Cartesian coordinate frame $(X_L, Y_L, Z_L)$,
   said geometrical constraint comprising alignment of said projector and said detector such that coordinate axes $Z_O$, $Z_P$, $Z_L$, are substantially parallel and coordinate axes $X_O$, $X_P$ and $X_L$ are substantially parallel.

6. An apparatus according to claim 5, wherein said geometrical constraint comprises configuring said coordinate axes $Z_0$, $Z_P$, $Z_L$, $X_0$, $X_P$ and $X_L$ to all lie in substantially the same plane.

7. An apparatus according to claim 5, wherein said geometrical constraint additionally comprises positioning said projector so that its origin $O_P$ lies on said $X_L$ axis of said detector.

8. An apparatus according to claim 5, wherein said geometrical constraint comprises positioning said projector so that its origin $O_P$ lies on said $X_L$ axis of said detector such that said coordinate frame origins $O_P$ and $O_L$ lie on the same plane.

9. An apparatus according to claim 8, wherein said same plane is inclined at an angle $\alpha$ to axis $Z_L$.

10. An apparatus as claimed in claim 8, wherein said projector projects visible light and said detector comprises a video camera having focal length F, said same plane being inclined at an angle $\alpha$ to axis $Z_L$, and said plane being defined in accordance with the equation: $y_B = -F \tan \alpha$ such that a beam projected in said plane is reflected back in the same plane and onto the image plane at row $-F \tan \alpha$.

11. An apparatus according to claim 1, wherein said occlusion type processing means is configured to process said obtained image data into an array of peaks of peak pixel data, each said peak substantially representing the centre of a said stripe received by said detector.

12. An apparatus according to claim 1, wherein said occlusion type processing means is configured to search said peaks in said array for discontinuities, said processing means being further configured to:
   create an occlusion map through identifying and labelling said discontinuities as at least being of a first type or of a second type of discontinuity.

13. An apparatus according to claim 12, wherein said created occlusion map is used to define boundaries for use by an indexing processing means, said indexing means being configured to index said stripes by using said boundary information and said stored classification.

14. An apparatus according to claim 13, wherein said indexing processing means is configured to process said peak pixel data in accordance with steps comprising:
   (a) selecting a start position in said peak pixel data and initialising a stripe index count for said selected stripe;
   (b) tracing the current stripe in a first direction along said stripe until a said first boundary condition is met;
   (c) returning to said start position and tracing said current stripe in the opposite direction to said first direction until a said boundary condition is met;
   (d) increasing the stripe index and moving to the next stripe in a third direction, said third direction substantially perpendicular to said first and second directions, and repeating steps (b) and (c);
   (e) repeating step (d) until a second boundary condition is met; and
   (f) returning to said start position and repeating steps (d) and (e), but moving in a fourth direction, said fourth direction being substantially 180° from said third direction, and decreasing said stripe index each time.

15. An apparatus according to claim 13, wherein said indexing processing means is configured to process said peak pixel data in accordance with a flood fill recursive processing routine.

16. An apparatus according to claim 13, wherein said indexed stripes are used to reconstruct a 3D surface of a scanned physical entity.

17. In a 3D scanning apparatus configured to In a 3D scanning apparatus configured to image a physical entity, said apparatus comprising a radiation projector for projecting a plurality of radiation stripes onto said physical entity, a detector for detecting said striped radiation received from said physical entity and a data storage device for storing said received radiation as a pixellated bitmap image comprising a plurality of rows, a method of imaging characterised in that:
   said physical entity, said radiation projector and said detector are geometrically arranged to constrain the number of times that each said received stripe is permitted to occur in a pixel row of said bitmap, said geometrical constraint determining an occlusion classification comprising a plurality of stored types of occlusions and said apparatus additionally comprising an occlusion type processing means for detecting said types of occlusions in said received image data.

18. The method according to claim 17, wherein said method utilises visible wavelength electromagnetic radiation.

19. The method according to claim 17, wherein said geometrical constraint restricts said predetermined number of times to once per row.

20. The method according to claim 17, wherein said stripes are uniform uncoded stripes.

21. The method according to claim 17, wherein:
   said physical entity is spatially defined with respect to a Cartesian coordinate frame $(X_O, Y_O, Z_O)$;

said projector has origin $O_P$ in a Cartesian coordinate frame $(X_P, Y_P, Z_P)$; and said detector has origin $O_L$ in a Cartesian coordinate frame $(X_L, Y_L, Z_L)$, said geometrical constraint comprising alignment of said projector and said detector such that coordinate axes $Z_0$, $Z_P$, $Z_L$, are substantially parallel and coordinate axes $X_0$, $X_P$ and $X_L$ are substantially parallel.

22. The method according to claim 21, wherein said geometrical constraint additionally comprises positioning said projector so that its origin $O_P$ lies on said $X_L$ axis of said detector.

23. The method according to claim 21, wherein said geometrical constraint comprises positioning said projector so that its origin $O_P$ lies on said $X_L$ axis of said detector such that said coordinate frame origins $O_P$ and $O_L$ lie on the same plane.

24. The method according to claim 23, wherein said same plane is inclined at an angle $\alpha$ to axis $Z_L$.

25. The method according to claim 24, wherein said projector projects visible light and said detector comprises a video camera having focal length F, said same plane being inclined at an angle $\alpha$ to axis $Z_L$ and said plane being defined in accordance with the equation: $y_B = -F \tan \alpha$ such that a beam projected in said plane is reflected back in the same plane and onto the image plane at row $-F \tan \alpha$.

26. The method according to claim 17, wherein said occlusion type processing step processes said obtained image data into an array of peaks of peak pixel data, each said peak substantially representing the centre of a said stripe received by said detector.

27. The method according to claim 17, wherein said geometrical constraint comprises configuring said coordinate axes $Z_0$, $Z_P$, $Z_L$, $X_0$, $X_P$ and $X_L$ to all lie in substantially the same plane.

28. The method according to claim 17, wherein said occlusion type processing step comprises the steps of:

searching said peaks in said array for discontinuities; and creating an occlusion map through identifying and labelling said discontinuities as at least being of a first type or of a second type of discontinuity.

29. The method according to claim 28, wherein said occlusion map is used to define boundaries for use in indexing said stripes, said indexing using said boundary information and said stored classification.

30. The method according to claim 29, wherein said indexing step is configured to process said peak pixel data in accordance with steps comprising:

(a) selecting a start position in said peak pixel data and initialising a stripe index count for said selected stripe;

(b) tracing the current stripe in a first direction along said stripe until a said first boundary condition is met;

(c) returning to said start position and tracing said current stripe in the opposite direction to said first direction until a said boundary condition is met;

(d) increasing the stripe index and moving to the next stripe in a third direction, said third direction substantially perpendicular to said first and second directions, and repeating steps (b) and (c);

(e) repeating step (d) until a second boundary condition is met; and (f) returning to said start position and repeating steps (d) and (e), but moving in a fourth direction, said fourth direction being substantially 180° from said third direction, and decreasing said stripe index each time.

31. The method according to claim 30, wherein said indexing step comprises processing said peak pixel data in accordance with a flood fill recursive processing routine.

32. The method according to claim 29, wherein said indexed stripes are used to reconstruct a 3D surface of a scanned physical entity.

33. A 3D scanning apparatus configured to image a physical entity, said apparatus comprising:

a radiation projector for projecting a plurality of radiation stripes onto said physical entity;

a detector for detecting said striped radiation received from said physical entity; and a data storage device for storing said received radiation as a pixellated bitmap image comprising a plurality of rows;

said apparatus characterised in that said physical entity, said radiation projector and said detector are geometrically arranged to constrain the number of times that each said received stripe is permitted to occur in a pixel row of said bitmap.

34. In a 3D scanning apparatus configured to In a 3D scanning apparatus configured to image a physical entity, said apparatus comprising a radiation projector for projecting a plurality of radiation stripes onto said physical entity, a detector for detecting said striped radiation received from said physical entity and a data storage device for storing said received radiation as a pixellated bitmap image comprising a plurality of rows, a method of imaging characterised in that:

said physical entity, said radiation projector and said detector are geometrically arranged to constrain the number of times that each said received stripe is permitted to occur in a pixel row of said bitmap.

35. A 3D scanning apparatus configured to image a physical entity, said apparatus comprising:

a radiation projector for projecting a plurality of radiation stripes onto said physical entity;

a detector for detecting said striped radiation received from said physical entity; and a data storage device for storing said received radiation as a pixellated bitmap image;

said apparatus characterised in that said physical entity, said radiation projector and said detector are geometrically arranged so that each said received stripe is permitted to occur only once in a given pixel row of said bitmap.

36. A 3D scanning apparatus configured to image a physical entity, said apparatus comprising:

a radiation projector for projecting radiation onto said physical entity;

a detector for detecting said striped radiation received from said physical entity; and a data storage device for storing said received radiation as a pixellated bitmap image; said apparatus configured in accordance with the predefined geometrical arrangement, wherein:

said predefined geometrical arrangement comprises a constraint such that each said received stripe can only occur a predetermined number of times in a pixel row of said bitmap.

* * * * *

UNITED STATES PATENT AND TRADEMARK OFFICE
CERTIFICATE OF CORRECTION

PATENT NO.         : 7,804,586 B2                                       Page 1 of 1
APPLICATION NO.    : 10/597468
DATED              : September 28, 2010
INVENTOR(S)        : Marcos A. Rodrigues It is certified that error appears in the above-identified patent and that said Letters Patent is hereby corrected as shown below:

Column 1, Line 6 "regrading"            should be -- regarding --

Column 10, Line 46 "stripe in the"      should be -- stripe. In the --

Column 13, Line 22 "ON and OF"          should be -- $O_N$ and $O_F$ --

Column 13, Line 23 "ON"                 should be -- $O_N$ --

Column 17, Line 60 "tan α"              should be -- tanα --

Column 17, Line 62 "tan α"              should be -- tanα. --

Column 19, Line 24 "tan α"              should be -- tanα --

Column 19, Line 26 "tan α"              should be -- tanα. --

Signed and Sealed this
Twenty-sixth Day of April, 2011

David J. Kappos
*Director of the United States Patent and Trademark Office*